(12) United States Patent
Stephenson et al.

(10) Patent No.: US 9,371,410 B2
(45) Date of Patent: Jun. 21, 2016

(54) POLYURETHANE ELASTOMERS FOR USE IN SUBSEA PIPELINE INSULATION

(71) Applicant: Dow Global Technologies LLC, Midland, MI (US)

(72) Inventors: Amber Stephenson, Lake Jackson, TX (US); Eric Rexrode, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 247 days.

(21) Appl. No.: 14/027,722

(22) Filed: Sep. 16, 2013

(65) Prior Publication Data

US 2015/0074978 A1 Mar. 19, 2015

(51) Int. Cl.
| | | |
|---|---|---|
| *F16L 13/02* | (2006.01) | |
| *B23K 31/02* | (2006.01) | |
| *C08G 18/32* | (2006.01) | |
| *C08G 18/76* | (2006.01) | |
| *C08G 18/22* | (2006.01) | |
| *C08G 18/48* | (2006.01) | |
| *C08G 18/66* | (2006.01) | |
| *C08G 18/00* | (2006.01) | |
| *F16L 58/18* | (2006.01) | |
| *F16L 59/20* | (2006.01) | |

(52) U.S. Cl.
CPC .......... *C08G 18/3206* (2013.01); *C08G 18/003* (2013.01); *C08G 18/222* (2013.01); *C08G 18/4841* (2013.01); *C08G 18/6674* (2013.01); *C08G 18/76* (2013.01); *F16L 13/0254* (2013.01); *F16L 13/0272* (2013.01); *F16L 58/181* (2013.01); *F16L 59/20* (2013.01); *Y10T 29/49888* (2015.01)

(58) Field of Classification Search
CPC .......... C08G 18/3206; C08G 18/4841; C08G 18/003; C08G 18/6674; C08G 18/76; C08G 18/222; F16L 59/20; F16L 13/0272; F16L 58/181; F16L 13/0254; Y10T 29/49888
See application file for complete search history.

(56) References Cited

U.S. PATENT DOCUMENTS

| | | | |
|---|---|---|---|
| 3,991,025 A | 11/1976 | Kutch | |
| 4,036,906 A | 7/1977 | Finelli | |
| 4,118,373 A | 10/1978 | Oruk | |
| 4,220,731 A | 9/1980 | Zuppinger | |
| 4,224,422 A | 9/1980 | Rude | |
| 4,731,392 A * | 3/1988 | Streu | C08G 63/16 521/172 |
| 5,126,423 A | 6/1992 | Iwamoto | |
| 6,706,776 B2 | 3/2004 | Markusch | |
| 2006/0079591 A1* | 4/2006 | Anderson | C08G 18/4816 521/174 |

* cited by examiner

*Primary Examiner* — John C Hong
(74) *Attorney, Agent, or Firm* — Gary C Cohn PLLC

(57) ABSTRACT

Polyurethane systems that cure similarly to systems based on mercury catalysts contain 1,4-butanediol and a zinc carboxylate catalyst. These systems cure and develop green strength similarly to systems based on mercury catalysts. These systems are especially useful in making insulated pipe joints for subsea pipeline installations.

10 Claims, 4 Drawing Sheets

POLYURETHANE ELASTOMERS FOR USE IN SUBSEA PIPELINE INSULATION

This invention relates to polyurethane elastomers useful as subsea pipe insulation.

Subsea pipelines are used globally in connection with oil and gas production, among other uses. These pipelines can extend for lengths of several miles. Because of their immense length, the pipe has to be manufactured in sections, which are joined together before the pipeline is laid.

The pipe often requires thermal insulation. Much of the insulation can be applied shortly after pipe sections are manufactured and well before subsea installation. However, the ends of the pipe sections are left bare, so they can be joined together to form the pipeline. In many cases, insulation is applied in the field, as the pipe sections are joined and the pipe is laid. Alternatively, segment joining and insulation can be applied at a "spool base" which is usually located on-shore. In these cases, the assembled and insulated pipe is reeled directly onto a spool for subsequent transportation and application offshore.

A polyurethane elastomer is often used as the joint insulation, because it can be applied easily in the field. The insulation is applied by positioning a mold about the pipe joint and introducing liquid polyurethane precursors into the mold. The precursors react spontaneously and cure, forming the insulation. To increase production rates, the mold often is removed before the polyurethane has fully cured. Instead, the mold is removed at an intermediate state of cure, when the polyurethane has hardened just enough to hold its shape. After the mold is removed, the polyurethane will continue to cure and develop physical properties.

The initial strength of the polyurethane, at the time the mold is removed, is commonly referred to as "green strength". Green strength is very important in pipeline joint insulation, because the insulated pipeline will experience flexural and compressive stresses immediately after demolding. Flexing can occur as the pipe is lowered into the ocean, and compression can occur as the pipe is gripped by tensioner pads or supported by rollers. The polyurethane insulation at the joints must rapidly develop enough strength to withstand these stresses without cracking, collapsing or separating from the adjacent insulation or underlying pipe.

Polyurethane cast elastomer formulations have for several decades been based on mercury catalysts. These catalysts provide a slow initial cure, which is needed to allow time to mix the polyurethane precursors and dispense them into the mold, followed by rapid curing. In this pipeline assembly process, the polyurethane systems based on these mercury catalysts develop green strength rapidly. This allows the mold to be removed faster and allows the pipeline to be assembled and emplaced more quickly. A further advantage of the mercury catalysts is that they provide advantageous curing characteristics over a range of curing temperatures. This is especially preferred for in-field applications like this pipe assembling operation, where curing conditions may not be carefully controlled and variations in curing temperature are common.

Unfortunately, mercury catalysts are being phased out and replacement systems need to be developed. Other catalyst systems have not been able to duplicate the curing characteristics of the mercury-based systems. There remains the problem of finding a polyurethane elastomer system having curing characteristics suitable for use in subsea pipeline joint applications.

This invention is, in one aspect, a process for assembling pipe segments, comprising the steps of:

a) providing a first length of insulated pipe and a second length of insulated pipe, each having at least one bare end which is free of insulation;

b) joining a bare end of the first length of insulated pipe to a bare end of the second length of insulated pipe to form a joint which resides in a gap between the insulation of the first and second lengths of insulated pipe and c) introducing a curable polyurethane forming reaction mixture into the gap and curing the reaction mixture to form a cured polyurethane elastomer in the gap between the insulation of the first and second lengths of insulated pipe, said elastomer covering the joint and adhering to the insulation on each side of the gap, wherein the reaction mixture comprises at least one polyether polyol having a hydroxyl equivalent weight of at least 1000, 1 to 20 parts by weight of 1,4-butanediol per 100 parts by weight of the polyether polyol(s), an aromatic polyisocyanate in an amount to provide an isocyanate index of 80 to 130 and a zinc carboxylate catalyst.

The invention is also a cured polyurethane elastomer which is a reaction product of a curable polyurethane-forming reaction mixture comprising at least one polyether polyol having a hydroxyl equivalent weight of at least 1000, 1 to 20 parts by weight of 1,4-butanediol per 100 parts by weight of the polyether polyol(s), an aromatic polyisocyanate in amount to provide an isocyanate index of 80 to 130 and a zinc carboxylate catalyst.

Surprisingly, by selecting 1,4-butanediol as the chain extender in this polyurethane system in conjunction with the zinc carboxylate catalyst, the system cures and develops green strength very similarly to conventional systems based on a mercury catalyst. This desirable effect is not obtained using the zinc catalyst in conjunction with other diol chain extenders such as diethylene glycol, nor is it obtained using 1,4-butanediol as the chain extender in conjunction with other non-mercury catalysts.

Figure 1:
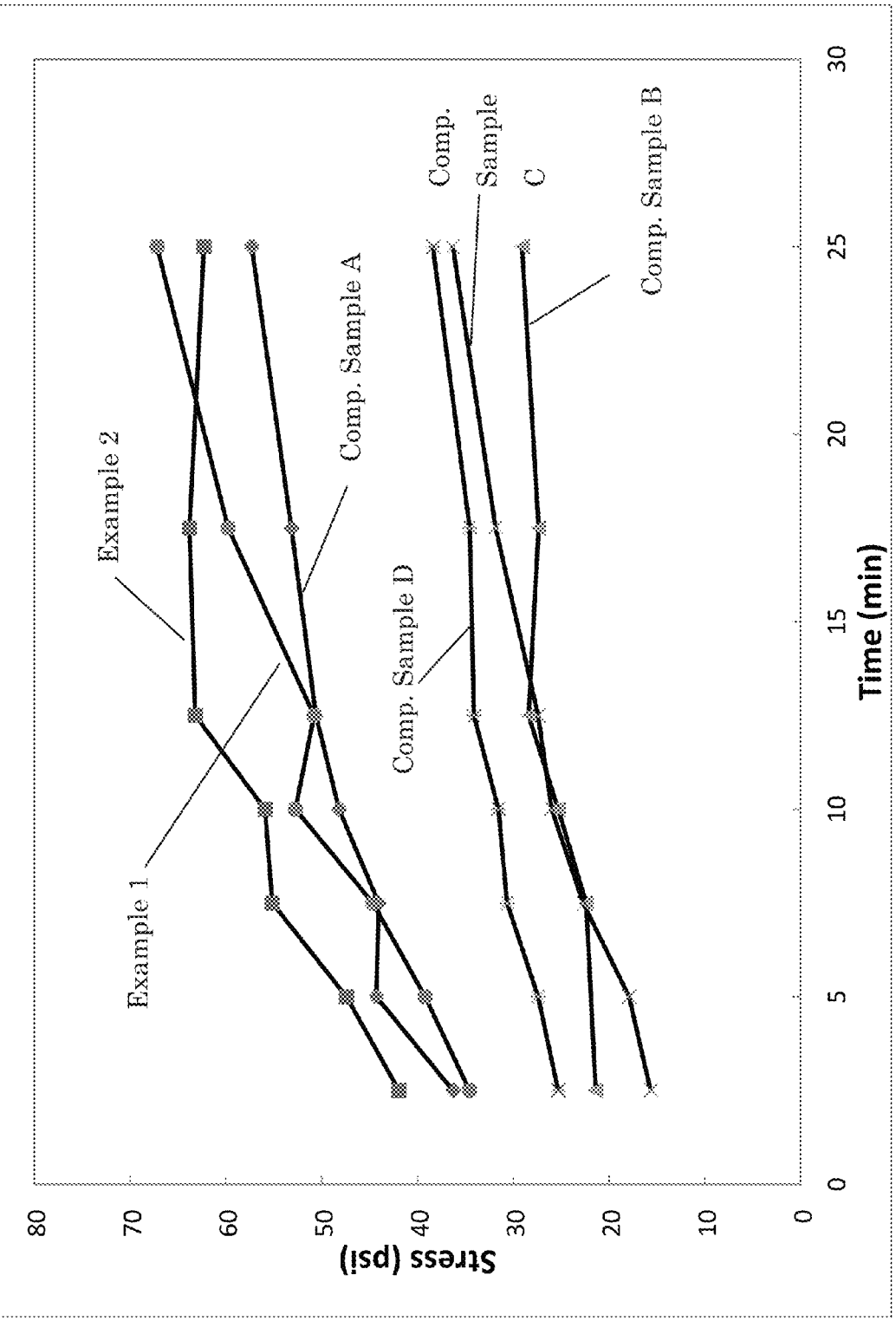
FIG. 1 is a graph showing compressive strength versus curing time, for two examples of the invention and four comparative examples.

The curable polyurethane-forming composition can contain as few as four components: (1) one or more polyether polyols having a hydroxyl equivalent weight of at least 1000, (2) 1 to 20 parts by weight of 1,4-butanediol per 100 parts by weight of the polyether polyol(s), (3) an aromatic polyisocyanate in amount to provide an isocyanate index of 80 to 130 and (4) a zinc carboxylate catalyst.

A preferred amount of 1,4-butanediol is 5 to 15 parts by weight for 100 parts by weight of the polyether polyol. A still more preferred amount is 10 to 15 parts by weight on the same basis.

A preferred isocyanate index is 90 to 125, and a still more preferred isocyanate index is 90 to 115. In calculating isocyanate index, any epoxide groups as may be present (due to the presence of an optional epoxy resin as described below, o otherwise) are not considered.

The amount of zinc carboxylate catalyst may be 0.01 to 1 part, preferably 0.01 to 0.5 part and more preferably 0.01 to 0.2 parts per 100 parts by weight polyether polyol.

The polyether polyol(s) have a hydroxyl equivalent weight of at least 1000. Any higher equivalent weight polyether polyol can be used, provided the polyether polyol is liquid by itself or in combination with other polyether polyol(s) in the formulations. The hydroxyl equivalent weight preferably is at least 1500 and is preferably up to 3000.

The polyether polyol(s) preferably have a nominal functionality of 2 to 6, preferably 2 to 4 and more preferably 2 to 3. The "nominal functionality" of a polyether polyol refers to the average number of alkoxylatable groups per molecule on the initiator compound(s) used to make the polyether polyol. Actual functionalities may be somewhat lower than nominal functionalities in some instances.

Initiators that are useful for producing the polyether polyol(s) include, for example, water, ethylene glycol, diethylene glycol, triethylene glycol, 1,2-propane diol, dipropylene glycol, tripropylene glycol, glycerin, trimethylolpropane, trimethylolethane, pentaerythritol and other aliphatic polyalcohols having a hydroxyl equivalent weight up to about 400. Primary and secondary amines are also useful initiators, but may cause the polyols to be more reactive than desired, so hydroxyl containing initiators are preferred.

A preferred polyether polyol is prepared by adding propylene oxide and then ethylene oxide to a trifunctional initiator to produce a polyol having a hydroxyl equivalent weight of 1500 to 2500, especially 1800 to 2200, and containing 5 to 20% by weight polymerized ethylene oxide. The polymerized ethylene oxide may be randomly polymerized with the propylene oxide, may form one or more internal blocks and/or, most preferably, may form terminal blocks that result in primary hydroxyl groups.

The aromatic polyisocyanate may be, for example m-phenylene diisocyanate, 2,4- and/or 2,6-toluene diisocyanate (TDI), the various isomers of diphenylmethanediisocyanate (MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3, 3'-dimethyldiphenylmethane-4,4'-diisocyanate, 4,4',4"-triphenylmethane triisocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates have an average of 1.9 to 2.3 isocyanate groups per molecule, especially from 2 to 2.2 isocyanate groups per molecule and an isocyanate equivalent weight of 125 to 200. The aromatic polyisocyanates may contain uretondione, uretonimine, isocyanurate, biuret, allophonate, carbodiimide, urethane or urea linkages.

Especially preferred polyisocyanates are diphenylmethane diisocyanate (MDI), including the 2,4'-, 2,2'- and 4,4'-isomers or mixtures of two or more of such isomers, "polymeric" MDI products which include a mixture of MDI and one or more polymethylene polyphenylisocyanates, and modified MDI that contain uretondione, uretonimine, isocyanurate, biuret, allophonate, carbodiimide, urethane or urea linkages and have an isocyanate equivalent weight of 130 to 200.

The zinc carboxylate catalyst is a zinc salt of a carboxylic acid. The carboxylic acid is preferably a monocarboxylic acid having 2 to 24, preferably 2 to 18, more preferably 6 to 18 and especially 8 to 12, carbon atoms. A mixture of carboxylates may be present.

All or a portion of the zinc carboxylate catalyst may engage in a rearrangement to form species which contain Zn—O—Zn linkages. These species are considered as zinc carboxylates for purposes of this invention.

The zinc carboxylate catalyst may be used by itself, or in combination with one or more other metal carboxylate catalysts. The other metal may be, for example, a group 3-12 metal. The zinc carboxylate preferably constitutes at least 50 mole-percent of such a mixture. A particularly useful catalyst mixture is a mixture of zinc carboxylate and zirconium carboxylate. Such a mixture may contain small amounts (up to 5 mole percent) of other metal carboxylates.

A suitable amount of metal carboxylate catalysts (i.e., the amount of the zinc carboxylate if used by itself or the total amount of metal carboxylates if a mixture is used), is 0.005 to 1, preferably 0.01 to 0.25 and more preferably 0.025 to 0.15 parts by weight per 100 parts by weight of the polyether polyol(s) that have an equivalent weight of 1000 or more. Additional catalysts (such as nitrogen-containing catalysts and tin catalysts), if present, are preferably present in small quantities, such as no more than 0.25 moles, preferably no more than 0.1 mole, of such additional catalyst per mole of zinc carboxylate catalyst. In some embodiments, no nitrogen-containing catalyst, tin catalyst, or other catalyst for the reaction of polyol groups with isocyanate groups is present.

For subsea applications, the polyurethane is preferably non-cellular, as a cellular material becomes easily crushed under high submarine pressures. Accordingly, the reaction mixture preferably has at most very small quantities (such as up to 0.5% by weight in total) of water or other chemical or physical blowing agent. Preferably, physical blowing agents and chemical blowing agents other than water are not added into the reaction mixture. Commercially available polyether polyols often contain small amounts, such as up to 0.25 weight percent, of water, and this water may be carried into the reaction mixture with the polyether polyol(s). Other starting materials may contain similarly small amounts of water. It is preferred, however, not to add water in addition to that (if any) carried in with the raw materials and it is in any case preferred that the reaction mixture contains no more than 0.25 weight percent water, based on the entire weight of the reaction mixture.

Moreover, it is preferred to include one or more components that function to help prevent foaming. One such component is a water scavenger, i.e., a material that adsorbs or absorbs water or otherwise ties up any water as may be present and thereby reduce the ability of that water to react with isocyanates during the curing reaction. Zeolites, molecular sieves, fumed silica and other desiccants can be used for this purpose. An anti-foam agent of various types can be used. The anti-foam agent acts to destabilize any gas bubbles as may form in the reaction mixture and cause them to collapse. Water scavengers and anti-foam agents are typically used in small amounts, such as 0.1 to 5 parts by weight per 100 parts by weight of the polyether polyol.

The reaction mixture may contain one or more isocyanate-reactive materials in addition to the 1,4-butane diol and the polyether polyol described above. However, such isocyanate-reactive materials, if used at all, are preferably used in small amounts, such as up to 5 parts by weight total per 100 parts by weight of the polyether polyol and more preferably up to 2 parts or up to 0.5 parts by weight total per 100 parts by weight of the polyether polyol. Such additional isocyanate-reactive materials most preferably are absent from the reaction mixture, except for impurities that may constitute up to 2% by weight of the 1,4-butanediol product. Examples of additional isocyanate-reactive materials of this type are polyester polyols, polyether polyols having equivalent weights of less than 1000, chain extenders (such as diamines and diols other than 1,4-butanediol having an equivalent weight of up to 250), crosslinkers (compounds having 3 or more hydroxyl groups or 1 or more primary or secondary amino groups and an equivalent weight of up to 250), and the like.

Another useful optional ingredient is an epoxy resin, which may be present, in an amount up to 20 parts by weight per 100 parts by weight polyether polyol. A preferred amount, if used, is 1 to 15 parts or 2 to 10 parts by weight per 100 parts by weight polyether polyol. It is preferred that the epoxy resin does not react significantly with the polyisocyanate or other components in the reaction mixture during the curing reaction. As a result, unreacted epoxy groups are present in the cured polymer. To minimize the reaction of the epoxy resin, it is preferred, when an epoxy resin is present, that the reaction mixture be essentially devoid i.e., contains no more than 5% by weight of, more preferably no more than 0.5% by weight of, based on the weight of the epoxy resin) of (1) any catalyst that catalyzes the reaction of an epoxy resin with an isocyanate group under the conditions of the curing reaction and (2) any epoxy hardener that contains thiol groups and/or amine hydrogens. Examples of catalysts for the epoxy-isocyanate reaction (which are preferably excluded from the reaction mixture) are strong Lewis acids, onium compounds (including stibonium, phosphonium and ammonium compounds and the like) as described, for example, in U.S. Pat. Nos. 5,126,423, 4,224,422 and 4,220,731.

Suitable epoxy resins include compounds having an average of at least 1.8 epoxide groups per molecule and an epoxy equivalent weight of up to 500, preferably 150 to 300 and more preferably 175 to 250. Suitable epoxy resins include diglycidyl ether of a diphenol such as, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of the polyphenol may be advanced, provided that the epoxy equivalent weight is about 200 or less.

Other suitable epoxy resins include epoxy novolac resins such as, for example, cresol-formaldehyde novolac epoxy resins, phenol-formaldehyde novolac epoxy resins and bisphenol A novolac epoxy resins; cycloaliphatic epoxides; tris(glycidyloxyphenyl)methane; tetrakis(glycidyloxyphenyl)ethane; tetraglycidyl diaminodiphenylmethane; oxazolidone-containing compounds as described in U.S. Pat. No. 5,112,932; and advanced epoxy-isocyanate copolymers such as those sold commercially as D.E.R.™ 592 and D.E.R.™ 6508 (The Dow Chemical Company). Still other useful epoxy resins are described, for example, in WO 2008/140906.

Other optional ingredients include particulate filler, fibers, reinforcing agents, colorants, biocides, preservatives and antioxidants. Fillers, fibers and reinforcing agents may be used in weights up to 200 parts per 100 parts by weight polyether polyol, but preferably are used in small quantities, such as up to 50 parts or up to 20 parts by weight per 100 parts by weight polyether polyol, and may be omitted entirely. Colorants, biocides, preservatives and antioxidants preferably are used in very small quantities, such as up to 5 or up to 2 parts by weight per 100 parts by weight polyether polyol, if used at all.

A polyurethane elastomer is formed by mixing the various components and allowing them to cure. It is often convenient to formulate the components into a polyol component which contains the polyether polyol and 1,4-butanediol (and any other isocyanate-reactive species including the epoxy resin if used, as may be present) and a separate isocyanate component that contains the polyisocyanate(s). Other ingredients can be formulated into either the polyol or isocyanate component, although it is typical to formulate most or all of these into the polyol component. To make the polyurethane, the polyol component and isocyanate component are mixed at proportions sufficient to provide an isocyanate index as indicated above, and allowed to cure.

The components can be heated when mixed, or mixed at ambient temperature. Preheating can be to 30 to 100° C., for example. The components are generally cured in a mold; the mold can be preheated if desired to a similar temperature. Heat can be applied throughout the curing process if desired; but this is not always necessary or desirable, as the curing reaction is exothermic. Cure temperatures above about 180° C. tend to promote the reaction of epoxide groups with isocyanate groups and are therefore less preferred. Curing is performed until the polyurethane has developed enough strength to be demolded without permanent damage or distortion. Once demolded, the polyurethane can be post-cured if desired.

In the pipe-assembling process of the invention, insulated pipe segments are joined together. The insulation on the pipe segments does not cover the ends of the pipes, and so leaves bare ends where they are to be joined. Therefore, when the pipes are joined, a gap in the insulation is produced. According to this invention, the gap in the insulation is filled with the polyurethane elastomer as described herein.

The pipe can be made of any material that is suitable for its intended use, provided it can withstand the temperatures of the polyurethane-curing process. Polymeric and ceramic materials can be used to make the pipe, and these materials can be reinforced if desired. The preferred materials of pipe construction for subsea applications are metals, especially steel. The insulation is typically an organic polymer, which is preferably non-cellular, which can be formed over the pipe via an extrusion or overmolding process. A wide variety of elastomeric or semi-elastomeric polymers can be used as the insulation, including, for example, various polyolefins, polymers and copolymers of vinyl chloride, various natural or synthetic rubbers, silicone-based materials, polyurethane elastomers, and the like. The pipe may also be coated with a corrosion inhibiting material, including, for example, fusion-bonded epoxy, thermally-sprayed aluminum, liquid-curable epoxies, and the like, prior to being coated with thermal insulation.

The pipe segments may be, for example, 1 to 20 meters in length, and 2 centimeters to 2 meters in diameter. The pipe segments may have diameters of at least 10 centimeters or at least 15 centimeters, and may have diameters up to 1 meter, up to 0.5 meters or up to 0.35 meters. The insulation layer may be 1 centimeters to 25 centimeters thick. The ends of the pipe segments may be flanged or otherwise adapted (via various fittings, for example) to be joined to an adjacent pipe segment to produce a joint between the adjacent pipe segments.

The pipes may be linear or have a more complex structure. They may be, for example, branched, curved or have other non-linear configurations.

The pipe segments can be joined in any convenient manner. They can be, for example, welded, screwed together, bolted together, or fastened using various types of fastening devices. The pipe ends can contain interlocking devices that permit adjacent pipe segments to become interlocked. If desired, gasketing materials can be inserted at the pipe joint to prevent leaks.

To form the polyurethane elastomer, a mold is placed around the joint. Typically, this mold is a sleeve that fits over the gap between the insulation of the adjacent pipe segments. The mold cavity, therefore, becomes defined by the pipe joint, the ends of the insulation on the adjacent pipe segment, and the internal surface of the sleeve. The mold contains one or more ports through which the polyurethane-forming reaction mixture is introduced and may contain one or more ports through which the gap is vented as the reaction mixture is introduced. The reaction mixture is introduced into the sleeve, filling the gap between the insulation on the adjacent pipe segments, and cures there to form the elastomer.

For subsea pipeline installations, the pipe joining process is generally performed on a ship or at a spool base. When pipe joining occurs on a ship, the assembled pipeline is deployed into the sea after demolding. When pipe joining occurs at a spool base, the pipeline usually is reeled onto a spool for transportation to sea. In these applications, the pipe is generally metal, and the joints are most typically welded.

It is common to apply a binder resin to the pipe joint before insulating it. The binder resin is typically an epoxy resin or other thermosetting polymer. Often, the binder resin is cured at high temperature, such as 180 to 250° C. This is commonly done by heating the pipe joint to this temperature and then applying the binder resin. The thickness of the binder layer may be, for example, 200 µm to 5 mm, more typically 300 to 500 µm.

For subsea applications, the polyurethane-forming reaction mixture commonly is introduced into the mold while the temperature of the pipe joint is in the range of 30 to 120° C. and more typically 40 to 80° C. It is common to heat the pipe joint to a high temperature, apply a corrosion inhibitor and/or binder resin as described, allow the pipe joint to cool into the range of 30 to 120° C. (more typically 60 to 80° C.), and then apply the polyurethane-forming reaction mixture into the gap as already described. It is usually not necessary to apply additional heat during the curing temperature, as the curing reaction is usually exothermic.

The following examples are provided to illustrate the invention, and are not intended to limit the scope thereof. All parts and percentages are by weight unless indicated otherwise.

EXAMPLE 1 AND 2 AND COMPARATIVE SAMPLES A, B, C AND D

Polyol A is a nominally trifunctional polyether made by adding propylene oxide and then ethylene oxide to a trifunctional initiator. Polyol A contains about 15% ethylene oxide by weight. It contains mainly primary hydroxyl groups and has a hydroxyl equivalent weight of about 2050.

Crosslinker A is a poly(propylene oxide) having a nominal hydroxyl functionality of about 4.3 and a hydroxyl equivalent weight of about 114.

The epoxy resin is a diglycidyl ether of bisphenol A, having an epoxy equivalent weight of 182-192.

The mercury catalyst is available commercially as Thorcat™ 535 from Thor Chemie.

The tin catalyst is a dibutyltindioctoate catalyst.

The DBU catalyst is a blocked 1,8-diazabicycloundec-7-ene.

The Zn catalyst is a zinc carboxylate which contains some species having Zn—O—Zn linkages. It also contains small amounts of other metal carboxylates.

Polyisocyanate A is a modified MDI having an isocyanate equivalent weight of 160-170 and an isocyanate functionality of about 2.0-2.2

Polyisocyanate B is a polymeric MDI having an isocyanate functionality of about 2.7 and an isocyanate equivalent weight of about 134.

Polyurethane Elastomer Examples 1 and 2, and Comparative Samples A through D are made from the formulations set forth in Table 1.

Comparative Sample A is a baseline formulation based on a mercury catalyst. It represents a performance target for a replacement system that does not contain mercury catalysts.

Comparative Sample B demonstrates the effect of using a heat-activated amidine catalyst as a replacement for the mercury catalyst.

Examples 1 and 2 are of this invention, and demonstrate the effect of selecting 1,4-butanediol as the chain extender in conjunction with a zinc carboxylate catalyst.

Comparative Samples C and D demonstrate the effect of using alternative chain extenders and/or crosslinkers, instead of 1,4-butanediol, in conjunction with the zinc carboxylate catalyst.

TABLE 1

| Ingredient (parts by weight) | Comp. A | Comp. B | Ex. 1 | Ex. 2 | Comp. C | Comp. D |
|---|---|---|---|---|---|---|
| Polyol A | 79.3 | 84.6 | 84.8 | 79.8 | 82.0 | 66.8 |
| 1,4-Butanediol | 11.9 | 11.8 | 11.8 | 1.8 | 0 | 0 |
| Crosslinker A | 0 | 0 | 0 | 0 | 0 | 12.3 |
| Propylene glycol | 0 | 0 | 0 | 0 | 6.3 | 0 |
| Diethylene glycol | 0 | 0 | 0 | 0 | 7.3 | 12.3 |
| Epoxy Resin | 5.0 | 0 | 0 | 5.0 | 0 | 4.8 |
| Mercury catalyst | 0.4 | 0 | 0 | 0 | 0 | 0 |
| Tin Catalyst | 0.02 | 0 | 0 | 0 | 0 | 0 |
| DBU catalyst | 0 | 0.25 | 0 | 0 | 0 | 0 |
| Zn catalyst | 0 | 0 | 0.05 | 0.06 | 0.07 | 0.07 |
| Polyisocyanate A | 50 | 50 | 50 | 50 | 0 | 62.5 |
| Polyisocyanate B | 0 | 0 | 0 | 0 | 50 | 0 |

Multiple plugs 1 inch (2.54 cm) in diameter and 2 inches (5.08 cm) in height are made from each of the foregoing formulations by introducing the reaction mixture into a preheated (80° C.) mold that has been sprayed with a mold release agent. The plugs are demolded after 2.5 minutes and all but one are immediately replaced into the oven. The compressive strength of the remaining plug is measured at 5% strain; the plug is insulated between the time it is outside of the oven and prior to testing to minimize heat loss. The remaining plugs are removed from the oven after, 5, 7.5, 10, 12.5, 17.5 and 25 minutes, respectively, and their compressive strengths measured in the same manner. Results are as indicated in FIG. 1.

In FIG. 1, Comparative Sample A, cured using the mercury catalyst, represents the target. It develops over 35 psi (241 kPa) of compressive strength (at 5% strain) after curing only 2.5 minutes, and continues to build strength, reaching a value of over 50 psi (345 kPa) after 25 minutes cure.

Examples 1 and 2 perform similarly or better than Comparative Sample A. After 2.5 minutes, the compressive strength of Example 1 is 4-5 psi (27-35 kPa) higher than Comparative Samples 1, and remains higher throughout the cure. Example 2 shows the effect of adding a small amount of epoxy resin into a formulation of the invention. At 2.5 minutes, the compressive strength is virtually equal to that of Comparative Sample A, and easily exceeds that of Comparative Sample A during later stages of the cure.

Comparative Sample B shows the effect of replacing the mercury catalyst system with a blocked amidine. Compressive strength at 2.5 minutes is only about 20 psi (138 kPa), which represents a drop of nearly 50%, compared to Comparative Sample A, and compressive strength continues to build very slowly. This shows that the blocked amidine catalyst does not perform nearly as well as the mercury catalyst system.

Comparative Samples C and D show the effect of combining different chain extenders (i.e., other than 1,4-butanediol)

in conjunction with the zinc catalyst. Here, compressive strengths remain significantly lower than Examples 1 and 2 and the target (Comparative Sample A), throughout the curing process.

Figure 2:
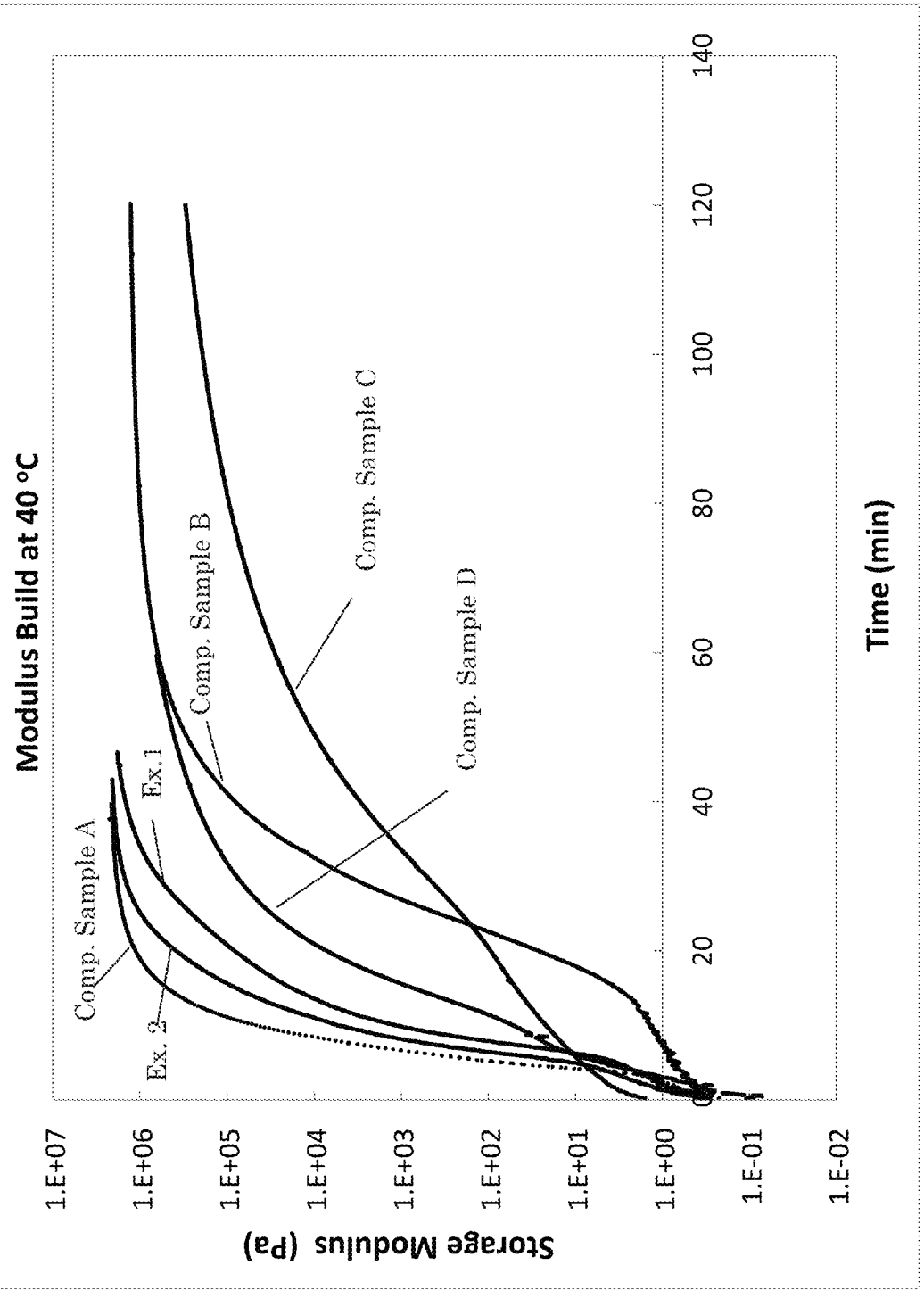
FIG. 2 is a graph showing storage modulus versus curing time at 40° C., for two examples of the invention and four comparative examples.

To further evaluate the curing characteristics of these systems, 30 grams samples of each of the formulations are mixed for about 30 seconds and then poured into a preheated (40° C.) parallel plate rheometer. The rheometer plates and reactive mixture are then maintained isothermally while the reaction progresses. For each formulation, storage modulus is recorded as a function of time. Results are shown graphically in FIG. 2.

The results of this storage modulus testing are similar to the compression strength testing results. The mercury-catalyzed system (Comparative Sample A) builds modulus most rapidly. Examples 1 and 2 build modulus only slightly more slowly than Comparative Sample A, which indicates essentially equivalent curing rates. Comparative Samples B, C and D build modulus much more slowly. In the case of Comparative Sample B, this indicates the inability of the blocked amidine catalyst to duplicate the curing characteristics of the mercury catalyst system. The results of Comparative Samples C and D demonstrate that the proper combination of chain extender and catalyst are needed to obtain the necessary cure. Samples C and D, which use different chain extenders, cure more slowly even though those samples use the same catalyst as Examples 1 and 2.

Figure 3:
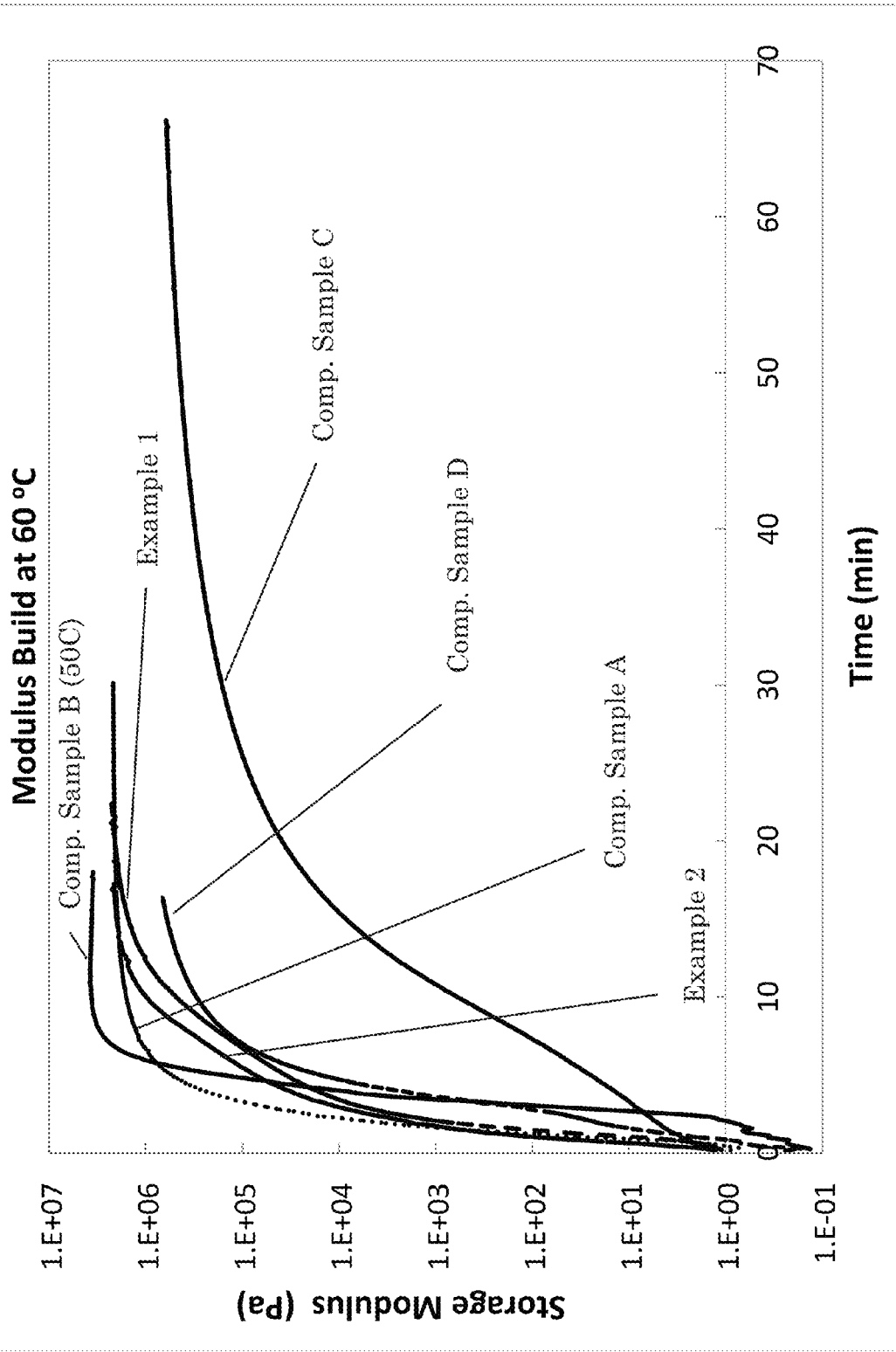
FIG. 3 is a graph showing storage modulus versus curing time at 60° C., for two examples of the invention and four comparative examples.
Figure 4:
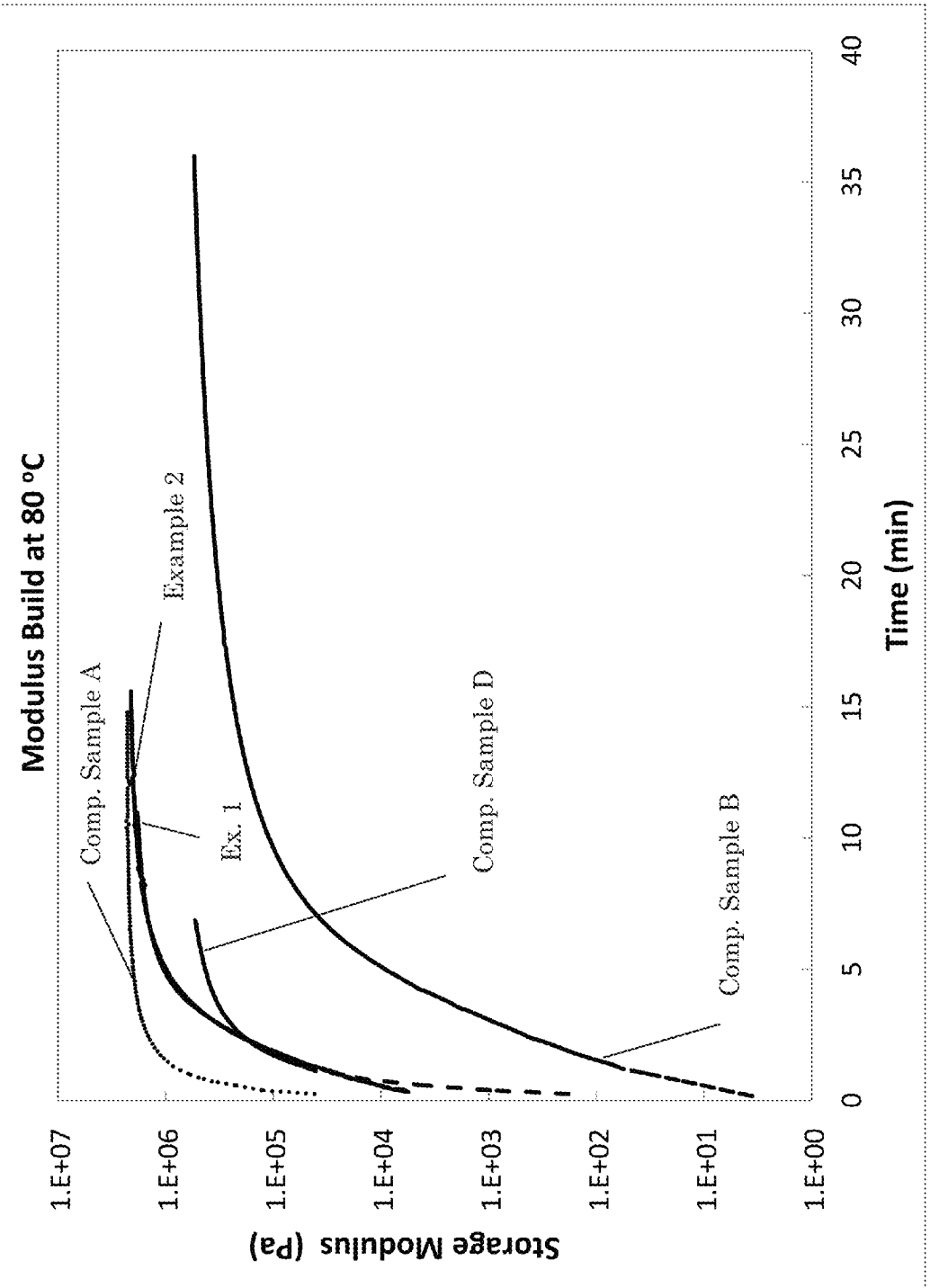
FIG. 4 is a graph showing storage modulus versus curing time at 80° C., for two examples of the invention and three comparative examples.

The rheometric test is repeated at 60° C. and 80° C., with results as indicated in FIGS. 3 and 4, respectively. At the 60° C. cure temperature, Comparative Samples A and D show similar curing profiles to Examples 1 and 2. Comparative Sample B, which contains the blocked amidine catalyst, cures too fast to measure at 60° C., and therefore 50° C. curing data is shown for that sample.

At the 80° C. curing temperature, Comparative Sample C once again cures very slowly, compared to the control with the mercury catalyst (Comparative Sample A). Examples 1 and 2 cure very similarly to the mercury-based system, reaching the same storage modulus after about 10-15 minutes. Comparative Sample D at first cures similarly to Examples 1 and 2, but storage modulus plateaus at nearly an order of magnitude lower. Comparative Sample B cures too quickly to measure on this test.

The results of the rheometric testing at the various temperatures shows that the zinc-based catalyst systems (Examples 1 and 2) provide a cure quite similar to that of the mercury-based system (Comparative Sample A) over the entire temperature range of 40 to 80° C. The blocked amidine system (Comparative Sample B) is unable to mimic the mercury system at any temperature. When used in conjunction with other chain extenders, even the zinc carboxylate system (Comparatives C and D) fails to cure as well as the 1,4-butanediol/zinc carboxylate system (Examples 1 and 2) or the mercury-based control. These results demonstrate the uniqueness of the zinc carboxylate/1,4-butanediol combination and the ability of that combination to mimic the curing characteristics of the mercury-based system over a wide range of cure temperatures.

The presence of the epoxy resin in Example 2 is seen to have little effect on the cure. Furthermore, analysis of the cured samples reveals the presence of epoxy groups, which indicates that, as expected, the epoxy groups did not react during the curing reaction. The benefit of providing the epoxy resin is demonstrated by making open-mold castings of Examples 1 and 2. The surface of the cured Example 1 materials shows a "crocodile skin" pattern, whereas the surface of cured Example 2 exhibits a smooth surface. The epoxy resin in Example 2 is therefore seen to provide better surface appearance in an open-mold casting.

Segments of a 2 inch (5.08 cm) diameter steel pipe having a 2" (5.08 cm) thick polymeric insulation coating are joined. The gaps in the insulation between the joint are filled with the Example 1 and Example 2 formulations, by encasing the gap in a mold, filling the mold and allowing the formulations to cure. In each case, the resulting polyurethane casting cures quickly, exhibits excellent green strength, and adheres well to the adjacent polymeric insulation.

What is claimed is:

1. A process for assembling pipe segments, comprising the steps of:
    a) providing a first length of insulated pipe and a second length of insulated pipe, each having at least one bare end which is free of insulation;
    b) joining a bare end of the first length of insulated pipe to a bare end of the second length of insulated pipe to form a joint which resides in a gap between the insulation of the first and second lengths of insulated pipe and
    c) introducing a curable polyurethane forming reaction mixture into the gap and curing the reaction mixture to form a cured polyurethane elastomer in the gap between the insulation of the first and second lengths of insulated pipe, said elastomer covering the joint and adhering to the insulation on each side of the gap, wherein the reaction mixture comprises at least one polyether polyol having a hydroxyl equivalent weight of at least 1000, 1 to 20 parts by weight of 1,4-butanediol per 100 parts by weight of the polyether polyol(s), an aromatic polyisocyanate in amount to provide an isocyanate index of 80 to 130 and a zinc carboxylate catalyst, and further wherein the reaction mixture further contains an epoxy resin in an amount up to 20 parts by weight per 100 parts by weight of the polyether polyol(s), the reaction mixture is essentially devoid of a catalyst for the reaction of epoxy group with an isocyanate group to form an oxazolidinone and essentially devoid of an amine curing agent or sulfide curing agent, and the cured elastomer contains epoxy groups from the epoxy resin.

2. The process of claim 1 wherein the amount of metal carboxylate catalyst is 0.01 to 0.5 parts by weight per 100 parts by weight of the polyether polyol(s) that have an equivalent weight of at least 1000.

3. The process of claim 2 wherein the reaction mixture contains no more than 2 parts by weight, per 100 parts by weight of the polyether polyol(s) that have an equivalent weight of at least 1000, of one or more polyols other than the polyether polyol and the 1,4-butanediol.

4. The process of claim 3 wherein the polyurethane elastomer is non-cellular.

5. The process of claim 4 wherein the reaction mixture contains no more than 0.25 weight percent water, based on the entire weight of the reaction mixture.

6. The process of claim 5, wherein the reaction mixture contains at least one of a water scavenger and an anti-foam agent.

7. The process of claim 1 wherein the polyurethane elastomer is non-cellular.

8. The process of claim 1, wherein the pipe segments are metal and are joined by welding.

9. The process of claim 1, wherein the reaction mixture is cured at 30 to 100° C.

10. The process of claim 1, wherein a binder is applied to the pipe joint before applying the polyurethane elastomer.

* * * * *